(12) United States Patent
Hu et al.

(10) Patent No.: US 12,487,226 B2
(45) Date of Patent: Dec. 2, 2025

(54) METHOD AND APPARATUS FOR EVALUATING VOLUMES OF DISCHARGED HYDROCARBON AND EXTERNALLY CHARGED HYDROCARBON IN MUD SHALE

(71) Applicant: China University of Petroleum—Beijing, Beijing (CN)

(72) Inventors: Tao Hu, Beijing (CN); Xiongqi Pang, Beijing (CN); Fujie Jiang, Beijing (CN); Yuan Liu, Beijing (CN); Guanyun Wu, Beijing (CN); Jiahao Lyu, Beijing (CN); Zhenxue Jiang, Beijing (CN); Yao Hu, Beijing (CN); Caijun Li, Beijing (CN); Chenxi Zhang, Beijing (CN); Meiling Hu, Beijing (CN); Renda Huang, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 678 days.

(21) Appl. No.: 17/894,087

(22) Filed: Aug. 23, 2022

(65) Prior Publication Data
US 2023/0053348 A1    Feb. 23, 2023

(30) Foreign Application Priority Data
Aug. 23, 2021    (CN) .......................... 202110966591.8

(51) Int. Cl.
    *G01N 33/24*    (2006.01)
(52) U.S. Cl.
    CPC ................................ *G01N 33/241* (2013.01)
(58) Field of Classification Search
    CPC .................................................... G01N 33/241
    See application file for complete search history.

(56) References Cited

U.S. PATENT DOCUMENTS

2020/0173902 A1*  6/2020  Wang ..................... G01N 15/08
2022/0058303 A1*  2/2022  Liu ......................... G16C 20/30
(Continued)

FOREIGN PATENT DOCUMENTS

CA         2993953 C   *  2/2021  .......... G01N 24/081
CN      105223340 A        1/2016
(Continued)

OTHER PUBLICATIONS

The first Office Action and search report issued on Apr. 29, 2024 for counterpart Chinese Patent Application No. 202110966591.8, along with machine EN translation downloaded from EPO, 7 pages.
(Continued)

*Primary Examiner* — John Fitzgerald
(74) *Attorney, Agent, or Firm* — LOZA & LOZA, LLP; Michael Fedrick

(57) ABSTRACT

A method and apparatus for evaluating volumes of discharged hydrocarbon and externally charged hydrocarbon in a mud shale. The method comprises: determining a hydrogen index and a current hydrocarbon generation potential parameter of a mud shale in target block based on total organic carbon test data and pyrolysis analysis test data of the mud shale; determining an original hydrogen index of the mud shale based on the hydrogen index and the pyrolysis analysis test data; and evaluating a volume of discharged hydrocarbon and a volume of externally charged hydrocarbon in the mud shale based on the current hydrocarbon generation potential parameter and the original hydrogen index.

12 Claims, 8 Drawing Sheets classifying organic matter types of the mud shale based on the hydrogen index and the pyrolysis analysis test data;      — 201 determining the original hydrogen index based on the organic matter types and the hydrogen index.      — 202

(56) References Cited

U.S. PATENT DOCUMENTS

| | | | | |
|---|---|---|---|---|
| 2023/0175961 A1* | 6/2023 | Hou | ................ | G01N 33/241 |
| | | | | 702/2 |
| 2023/0184737 A1* | 6/2023 | Jacobi | ............... | G01N 33/241 |
| | | | | 702/8 |

FOREIGN PATENT DOCUMENTS

| | | | | | |
|---|---|---|---|---|---|
| CN | 110322094 | A | | 10/2019 | |
| CN | 107727832 | B | * | 8/2020 | .......... G01N 33/241 |
| CN | 112052429 | A | | 12/2020 | |
| CN | 112179806 | A | | 1/2021 | |
| WO | WO-2014036077 | A1 | * | 3/2014 | ............ G06F 30/20 |

OTHER PUBLICATIONS

Jin Jun et al., "Structural/Sedimentary Environment and Hydrocarbon-Generating Potentials of Carboniferous in Junggar Basin," Xinjiang Petroleum Geology, Apr. 2009, vol. 30, No. 2, pp. 211-214.

Fu Xiaodong et al., "The comparison of hydrocarbon generation and evolution characteristics between two temperature pressure simulation systems and its geological significance for deep reservoir exploration," Geochimica, May 2017, vol. 46, No. 3, pp. 262-275.

Hu Tao et al., "Identification and evaluation of shale oil micro-migration and its petroleum geological significance," Petroleum Exploration and Development, Feb. 2024, vol. 51, No. 1, pp. 114-126.

China National Intellectual Property Administration Search Report for Application No. 2021109665918, dated Apr. 26, 2024, 6 pages.

Zou, et al., "Organic-matter-rich shales of China", Earth-Science Reviews, vol. 189, Feb. 2019, pp. 51-78.

Zhijun, et al., "Has China ushered in the shale oil and gas revolution? ", China Academic Journal Electronic Publishing House, Oil & Gas Geology, Mar. 2019, vol. 40, No. 3, pp. 453-458.

Zhao, et al., "Types and resource potential of continental shale oil in China and its boundary with tight oil", China Academic Journal Electronic Publishing House, Petroleum Exploration and Development, vol. 47, No. 1, 2020, pp. 1-10.

Jarvie, "Shale resource systems for oil and gas: Part 2—Shale-oil resource systems", in J. A. Breyer, ed., Shale reservoirs—Giant resources for the 21st century: AAPG Memoir, vol. 97, 2012, p. 89-119.

Jarvie, "Components and processes affecting producibility and commerciality of shale resource systems", Geologica Acta, vol. 12, No. 4, Dec. 2014, pp. 307-325.

Haitao, et al., "Correction of oil content—one key parameter in shale oil resource assessment", China Academic Journal Electronic Publishing House, Oil & Gas Geology, Jan. 2016, vol. 37, No. 1, pp. 15-22.

Shuangfang, et al., "Classification and evaluation criteria of shale oil and gas resources : Discussion and application", China Academic Journal Electronic Publishing House, Petroleum Exploration and Development, vol. 39, No. 2, 2012, pp. 249-256.

Sanei, et al., "Characterization of organic matter fractions in an unconventional tight gas siltstone reservoir", International Journal of Coal Geology, vol. 150-151, Apr. 2015, pp. 296-305.

Romero-Sarmiento, et al., "New Rock-Eval Method for Characterization of Unconventional Shale Resource Systems", Oil & Gas Science and Technology—Rev. IFP Energies Nouvelles, 2016, vol. 71, No. 37 (9 pages).

Maende, et al., "Advanced Pyrolysis Data and Interpretation Methods to Identify Unconventional Reservoir Sweet Spots in Fluid Phase Saturation and Fluid Properties (API Gravity) From Drill Cuttings and Cores", Search and Discovery Article #80596, Adapted from oral presentation given at AAPG 2017 Annual Convention and Exhibition, Houston, Texas, Apr. 2-5, 2017, Jun. 2017, pp. 1-23.

Qigui, et al., "Quantitative characterization of shale oil in different occurrence states and its application", China Academic Journal Electronic Publishing House, Petroleum Geology & Experiment, vol. 38, No. 6, Nov. 2016, pp. 842-849.

Espitalie, et al., "Source Rock Characterization Method for Petroleum Exploration", Offshore Technology Conference, vol. 2935, May 1997, pp. 439-444.

Lafargue, et al., Rock-Eval 6 Applications In Hydrocarbon Exploration, Production, and Soil Contamination Studies Institut français du pétrole, vol. 53, No. 4, Jul.-Aug. 1998, pp. 421-437.

Behar, et al., "Rock-Eval 6 Technology: Performances and Developments", Oil & Gas Science and Technology—Rev. IFP, 2001, vol. 56, No. 2, pp. 111-134.

Su, et al., "A new method for continental shale oil enrichment evaluation", Society of Exploration Geophysicists, Interpretation, May 2017, pp. T209-T217.

Loucks, et al., "Morphology, genesis, and distribution of nanometer-scale pores in siliceous mudstones of the Mississippian Barnett shale" Journal of Sedimentary Research, Jun. 2009, vol. 79, pp. 848-861.

Modiea, et al., "Estimation of kerogen porosity in source rocks as a function of thermal transformation: Example from the Mowry Shale in the Powder River Basin of Wyoming", American Association of Petroleum Geologists Bulletin vol. 96, No. 1, Jan. 2012, pp. 87-108.

Qian, et al., "Quantitative characterization of extractable organic matter in lacustrine shale with different occurrences", Paper presentation at the 28th International Meeting on Organic Geochemistry, Sep. 2017, 2 pages.

Li, et al., "Assessment of shale oil potential using a new free hydrocarbon index", International Journal of Coal Geology, 156, Feb. 2016, pp. 74-85.

Li, et al., "Idea, Method and Application of Evaluating Shale Oil Potential by Free Hydrocarbon Difference", Earth Science, vol. 44, No. 3, Mar. 2019, pp. 929-938.

Williams, et al., "Visualisation of Fluid Displacement in Rock Cores by NMR Imaging", Magnetic Resonance Imaging, vol. 9, Nov. 1991, pp. 767-773.

Li, et al., "Nuclear Magnetic Resonance T1-T2 Map Division Method for Hydrogen-Bearing Components in Continental Shale", American Chemical Society, Energy Fuels, vol. 32, Aug. 2018, pp. 9043-9054.

Li, et al., "Adsorbed and free hydrocarbons in unconventional shale reservoir: A new insight from NMR T1-T2 maps", Marine and Petroleum Geology vol. 116, Feb. 2020, 104311 (14 pages).

Jorgensen, et al., "Optimized Intermolecular Potential Functions for Liquid Hydrocarbons", J. Am. Chem. Soc., vol. 106, Mar. 1984, pp. 6638-6646.

Plimpton, "Fast Parallel Algorithms for Short-Range Molecular Dynamics", Journal of Computational Physics, vol. 117, Mar. 1995, pp. 1-19.

Ambrose, et al., "Shale Gas-in-Place Calculations Part I: New Pore-Scale Considerations", Society of Petroleum Engineers, SPE Journal, Mar. 2012, pp. 219-229.

Wang, et al., "Molecular dynamics simulation of liquid alkane occurrence state in pores and slits of shale organic matter", Petroleum Exploration and Development, vol. 42, Issue 6, Dec. 2015, pp. 844-851.

Harrison, et al., "Branched versus linear alkane adsorption in carbonaceous slit pores", Adsporption, vol. 20, 2014, pp. 427-437.

Hu, et al., "Movable oil content evaluation of lacustrine organic-rich shales: Methods and a novel quantitative evaluation model", Earth-Science Reviews, 2021, vol. 214, 103545 (26 pages).

Chen, et al., "A data driven model for studying kerogen kinetics with application examples from Canadian sedimentary basins", Marine and Petroleum Geology vol. 67, Jul. 2015, pp. 795-803.

Hai-Tao, et al., "Selection and Verification of Key Parameters in the Quantitative Evaluation of Shale Oil: A Case Study at the Qingshankou Formation, Northern Songliao Basin", Bulletin of Mineralogy, Petrology and Geochemistry, vol. 34, No. 1, Jan. 2015, pp. 70-78.

* cited by examiner

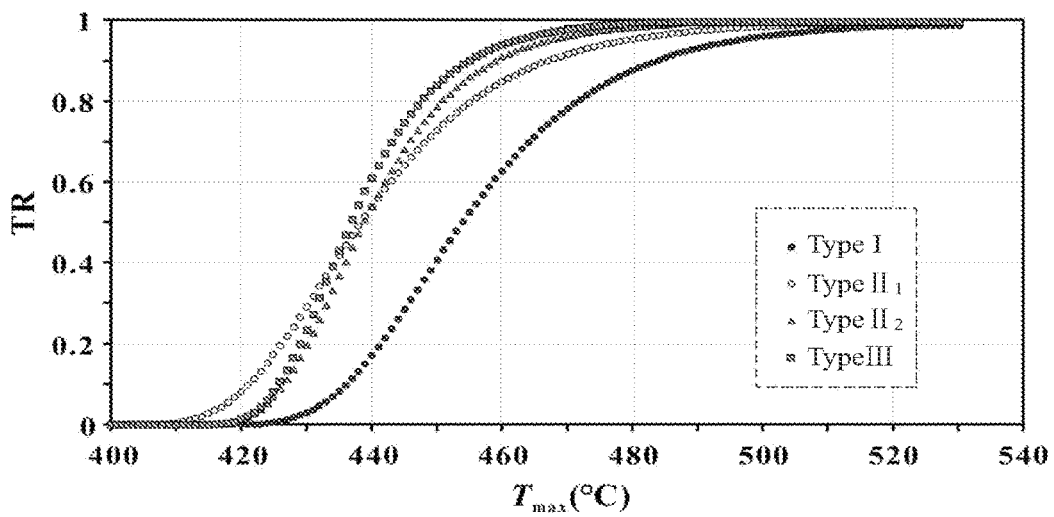

FIG. 8

```
obtaining data of a total organic carbon content TOC, a pyrolysis soluble
hydrocarbon volume S₁, a pyrolytic hydrocarbon volume S₂ and a maximum      ── S1
pyrolysis peak temperature Tmax of a mud shale core through a total organic carbon
               test and a pyrolysis analysis test
``` making a scatter diagram of $HI$ and $T_{max}$ based on $HI$ and $T_{max}$ of the mud shale core obtained in step S1, and classifying the organic matter types of the mud shale core based on an $HI$-$T_{max}$ organic matter type classification chart ── S2 performing a numerical simulation on a data-driven model of kerogen hydrocarbon generation kinetics based on the organic matter types classified in step S2, so as to establish evolution models representing variation of $HI$ of various types of kerogen over $T_{max}$ ── S3 calculating the original hydrogen index $HI_o$ of the mud shale core based on $HI$ of the mud shale core obtained in step S1 and $TR$ corresponding to various pyrolysis peak temperatures $T_{max}$ obtained in step S3 ── S4 calculating the pyrolysis soluble hydrocarbon volume $S_{1C}$ of the mud shale core on which the light hydrocarbon correction has been performed based on a light hydrocarbon compensation correction chart of a mud shale core proposed by Xue Haitao et al. (2015) ── S5 calculating volume of discharged/externally-charged hydrocarbon $\Delta Q$ based on the original hydrogen index $HI_o$ of the mud shale core obtained in step S4 and the current hydrocarbon generation potential $I_{HGP}$ of the mud shale core obtained in step S5 ── S6

FIG. 9

METHOD AND APPARATUS FOR EVALUATING VOLUMES OF DISCHARGED HYDROCARBON AND EXTERNALLY CHARGED HYDROCARBON IN MUD SHALE

CROSS-REFERENCE TO RELATED APPLICATIONS

This application claims priority under 35 U.S.C. § 119 to Chinese Patent Application No. 202110966591.8, filed on Aug. 23, 2021, which is hereby incorporated by reference in its entirety.

TECHNICAL FIELD

The present disclosure relates to a technical field of oil and gas explorations, particularly to a technical field of quantitative evaluation of oil-bearing property of mud shale, and more particularly to a method and apparatus for evaluating volumes of discharged hydrocarbon and externally charged hydrocarbon in a mud shale.

BACKGROUND

China is rich in shale oil resources, and technically recoverable resources at present are about 3 to 10 billion tons (Zou et al., 2019; Jin Zhijun et al., 2019; Zhao Wenzhi et al., 2020). The shale oil is an important field for China to obtain stable oil and gas production capacities under a background that China's oil dependence on foreign countries reached 71.06% in 2019. During exploration and development of shale oil, a quantitative evaluation of an oil-bearing property of a mud shale has long been a key scientific issue of concern, which is directly related to the optimization of mud shale oil 'desserts' and determines a success rate of mud shale oil drilling. However, due to a strong heterogeneity of the mud shale per se, the research on the quantitative evaluation of the oil-bearing property is slow, which has become a difficult problem to be solved urgently. Different scholars have put forward different methods to evaluate the oil-bearing property of the mud shale, and great progresses has been made in the evaluation from the oil-bearing property of the mud shale to the mud shale oil in different occurrence states thereof.

For example, in 2012, in North America, Jarvie. et al. (2012, 2014) carried out researches on tight mud shale oil systems of Barnett, Antelope and Tuscaloosa, fractured shale oil systems of Monterey, Bakken, Pierre and Bazhenov, and hybrid mud shale oil systems of Bakken, Eagle Ford and Niobrara. In addition, OSI value (volume of pyrolyzed soluble hydrocarbon $S_1$/TOC×100) of mud shale oil producing layers are counted, and it is found that an shale interval with an OSI value greater than 100 HC/g TOC has industrial productivity, while the exploration and development effect of the shale oil is poor in case of a lower OSI value. Therefore, it is proposed that when the OSI value is lower than 100 HC/g TOC, it is difficult for the shale oil to flow effectively, and this phenomenon is called as an Oil Crossover Effect. It is considered that the OSI value can be used to evaluate the oil-bearing property of the mud shale which becomes better as the OSI value increases. However, this method has two deficiencies: 1) the heterogeneity of the mud shale is extremely strong, and when the values of $S_1$ and TOC are very low, the situation OSI>100 HC/g TOC also exists, so there may be a misjudgment in the evaluation of the oil-bearing property; 2) during drilling and coring in the exploratory well of the mud shale oil, the obtained mud shale core has a serious light hydrocarbon loss (Xue Haitao et al., 2016), which will cause the calculated OSI value to be low; and 3) the evaluation of the oil-bearing property is just a qualitative comparison, while a quantitative characterization is not realized.

In 2012, Lu Shuangfang, etc. statistically analyzed geochemical parameters of continental mud shales in Songliao Basin, Hailar Basin, Yitong Basin and Bohai Bay Basin, and classified the mud shale oil into dispersed, inefficient and enriched resources based on 'trichotomy' of a relationship between the mud shale oil content ($S_1$) and TOC, wherein the oil-bearing property of the enriched resources is the best, the oil-bearing property of the inefficient resources takes a second place, and the oil-bearing property of the dispersed resources is the poorest. As compared with the evaluation of the oil-bearing property of the mud shale only using the OSI value (Jarvie. et al., 2012, 2014), this method further introduces the absolute values of $S_1$ and TOC, thereby avoiding the misjudgment that OSI can still be greater than 100 HC/g TOC although the values of $S_1$ and TOC are very low. However, there are still two deficiencies: 1) the serious light hydrocarbon loss of the cores during drilling and coring in the exploratory well of the mud shale oil is not considered (Xue Haitao et al., 2016); and 2) the evaluation of the oil-bearing property is just a qualitative comparison, while a quantitative characterization is not realized.

Later, many scholars improved the traditional Rock-Eval method to prepare for evaluation of the oil-bearing property of the mud shale (Sanei et al., 2015; Romero-Sarmiento et al., 2016; Maende et al., 2017; Jiang Qigui et al., 2016). Representatively, Jiang Qigui et al. (2016) established a quantitative evaluation procedure of crude oil in different occurrence states in the mud shale by comparing and analyzing pyrolysis chromatography of thermohydrocarbon components in different temperature sections with thermohydrocarbon before and after a dichloromethane extraction. Specifically, is tested at a constant temperature of 200° C. for 1 min; next, the temperature is raised to 350° C. at 25° C./min to test $S_{1-2}$ at a constant temperature of 350° C. for 1 min; next, the temperature is raised to 450° C. at 25° C./min to test $S_{2-1}$ at a constant temperature of 450° C. for 1 min; and finally, the temperature is raised to 600° C. at 25° C./min to test $S_{2-2}$, wherein $S_{1-1}$ is mainly a light oil component, $S_{1-2}$ is mainly a light and medium oil component, $S_{2-1}$ is mainly a heavy hydrocarbon and colloidal asphaltene component, $S_{2-2}$ is mainly a kerogen pyrolysis regenerated hydrocarbon, and a sum of $S_{1-1}$, $S_{1-2}$ and $S_{2-1}$ represents a total oil content in the mud shale. This method can simply and quantitatively evaluate the oil content of the mud shale. However, it should be noted that since all the methods for obtaining the oil-bearing property of the mud shale through laboratory analyses inevitably lead to a serious light hydrocarbon loss during sample preservation and preparation (Espitalié et al., 1997; Lafargue et al., 1998; Behar et al., 2001), when this method is adopted to quantitatively evaluate the mud shale mobile oil, $S_1$ should be subjected to a light hydrocarbon correction.

Su et al. (2017) analyzed the relationships among OSI value, porosity (Φ) and permeability (k) of the mud shale, and found that OSI was positively correlated with Φ, while obviously negatively correlated with $(K/(\Phi \times 100))^{1/2}$. It is considered that the oil-bearing property of the mud shale is negatively correlated with the permeability, and the crude oil in the mud shale can be migrated and discharged more easily as the permeability increases, so that the oil-bearing property is degraded. In addition, a Pore Saturation Index (PSI) of the mud shale is established, and the oil-bearing property becomes better as a PSI value increases. This method has two limitations: 1) measurement accuracies of a porosity and an oil saturation of the mud shale are greatly affected by other factors; if a Dean Stark extraction is required for the mud shale, some kerogen may be dissolved during the extraction, which will cause test values of the porosity and the oil saturation to be unusually high (Loucks et al., 2009; Modiea and Lapierre, 2012); and 2) this method defaults that the permeability is negatively correlated with the oil-bearing property; but the mud shale is a reservoir with a low porosity and a low permeability, and in fact, the crude oil mainly occurs in large pores and fractures; therefore, the index more reflects the crude oil retained in the matrix pores.

Qian Menhui et al. (2017) evaluated the oil-bearing properties of crude oil in different occurrence states in the mud shale by using combinations of different polar solvents and different extraction methods, wherein lump samples are extracted with a weak polar solvent, and the extract is mainly free crude oil. The lump sample are crushed to increase artificial cracks (similar to hydraulic fractures during the oil and gas development), and improve the fluidity of the soluble organic matters, and the extract is free crude oil. The mud shale reservoir space mainly consists of nano-scale pore throats, micro-cracks and micron-scale pores, wherein a pore size of the nano-scale pore throats is generally less than 500 nm, and the micron-scale pores can vary from several μm to tens of μm. Therefore, when the samples are crushed to a level of 150 meshes (a particle size of about 95.9 μm), the micron-scale reservoir space of the mud shale oil is substantially destroyed, and the polar solvent can easily contact the crude oil adsorbed in the mud shale, thereby 'resolving' the adsorbed crude oil. The kerogen adsorption is mainly a surface adsorption of an aromatic structure. After illite and montmorillonite are mixed in clay minerals, due to the strong adsorption force of interlayer $K^+$, there is a stronger adsorption force for soluble organic macromolecules, and a stronger polar solvent is required for desorbing the crude oil adsorbed on a surface of a rock mineral. This method has two limitations: 1) there is a serious light hydrocarbon loss during preservations and preparations of the core samples (Espitalié et al., 1997; Lafargue et al., 1998; Behar et al., 2001); and 2) during the analysis, this method involves not only preparations of the bulk and powder samples, but also proportioning tests of various polar solvents, so the analysis process is complicated and expensive, and it is limited to the study of typical samples.

Li et al. (2016) and Li Shuifu et al. (2019) proposed a 'free hydrocarbon difference method' to evaluate an oil-bearing property of a mud shale. Firstly, the method divides the mud shale into tiny hydrocarbon generation and expulsion units. An original hydrocarbon generation volume of each of the hydrocarbon generation and expulsion units is calculated based on a kerogen hydrocarbon generation principle, and then an existing hydrocarbon volume of the corresponding unit is subtracted to obtain a free hydrocarbon difference ($\delta S_1$) of each of the hydrocarbon generation and expulsion units. The oil-bearing property of the mud shale can be evaluated with $\delta S_1$. When $\delta S_1 < 0$, it indicates that the original hydrocarbon generation volume of the mud shale is less than the existing free hydrocarbon volume, and there is an input of external hydrocarbon, so the mud shale belongs to an open oil-gas-rich unit (type A). When $\delta S_1 > 0$ but $\delta S_1$ is not greater than or is close to zero, it means that the original hydrocarbon generation volume is substantially equal to the existing free hydrocarbon volume, indicating that this kind of mud shale has poor connectivity with adjacent mud shales and belongs to a closed unit (type B). Type B includes two situations: 1) the mud shale has a high TOC and a large oil-gas-generation volume, but since it is closed relative to the outside, the generated oil and gas are substantially not discharged externally, so the mud shale has a high oil-bearing property and is a closed oil-rich unit (type $B_1$); 2) the mud shale has a low TOC and a small oil-gas-generation volume, and after the mud shale adsorption is satisfied, the volume of remaining oil and gas is small; meanwhile, since the mud shale has poor connectivity with the outside, the existing oil-bearing property is low, and the mud shale is a closed oil-gas-poor unit (type $B_2$). When the value of $\delta S_1$ is obviously greater than zero, it means that the original hydrocarbon generation volume of the mud shale is obviously greater than the existing hydrocarbon volume, indicating that the generated oil and gas is mainly discharged to adjacent strata. This kind of mud shale has a high TOC content, a large oil-gas-generation volume, well-developed micro-cracks and good connectivity with the outside, so that a large volume of oil and gas generated from the mud shale can be discharged, resulting in a good oil-bearing property, and the mud shale belongs to an open oil-gas-poor unit (type C). From the perspective of the oil-bearing property, type A>type $B_1$>type $B_2$>type C. This method has two limitations: 1) the mud shale core has a serious light hydrocarbon loss, and the light hydrocarbon should be corrected; 2) only the oil-bearing property of the mud shale is qualitatively compared, but a quantitative evaluation thereof is not realized.

The nuclear magnetic resonance (NMR) technology is non-destructive to the pore media of the mud shale, with the advantages of non-invasion and lossless, and is only sensitive to the fluid in the pore media, so more and more researches have been carried out on the application of the NMR technology in the evaluation of the oil-bearing property of the mud shale (Williams et al., 1991). Wang et al. (2018) and Li et al. (2018) adopted the NMR technology to analyze the $T_1$-$T_2$ spectra of kerogen in lacustrine mud shale, kerogen containing adsorbed oil, clay minerals with different water contents, mud shale, mud shale after extraction, saturated oil and saturated water, and summarized the distribution ranges of various hydrogen-containing components in the $T_1$-$T_2$ spectra. Li et al. (2020) subsequently improved the $T_1$-$T_2$ spectrogram, which made it possible to accurately evaluate the oil-bearing property of the mud shale by using the 2D NMR technology. However, this method has three limitations: 1) the application effect is good in the conventional reservoirs; but since the mud shale is very compact while the porosity and permeability are low, not only the effect of displacement/centrifugation is weaker than the actual effect, but also the excessive pressure may cause the mud shale to rupture and affect the experiment result; 2) when the pore throat of the mud shale is small to a certain extent, the physical significance of nuclear magnetic parameters may change; and 3) during the analysis and test, this method involves the centrifugation/displacement and the nuclear magnetic resonance experiment, so the analysis process is complex and expensive, and it is limited to the study of typical samples.

On the other hand, the molecular dynamics simulation is a molecular simulation method rising in recent years. This method mainly relies on the Newtonian mechanics to simulate the motion trajectory of molecules, and calculates the structure and properties of the system by statistically averaging the ensemble composed of different states (Jorgensen et al., 1984; Plimpton, 1995; Ambrose et al., 2012; Wang Seng et al., 2015). Some scholars have tried to use this method to study the occurrence of crude oil in the mud shale (Wilson et al., 2015), which can provide some reference for the evaluation of the oil-bearing property of the mud shale. However, at present, the application of this method is very limited for three main reasons: 1) currently, the pores and fractures in the mud shale reservoir are mainly replaced with slits, and it is difficult to fully consider the strong heterogeneity of the pore and fracture development; 2) the accuracy of this method depends on the selection of the force field model, and the force fields applicable to different substances are varied (Ambrose et al., 2012); and 3) at present, graphene is generally adopted in the world to replace the organic structure, and six layers of graphene may be used as solid walls of an organic nano-fracture, but it is still far from reflecting the heterogeneity of kerogen (Harrison et al., 2014).

Taking the mud shale of Paleogene Shahejie Formation in Dongpu Sag of Bohai Bay Basin, China as a research object, and considering the influence of the light hydrocarbon loss, Hu et al. (2021) analyzed relationships between various geological and geochemical factors (abundance, type, thermal evolution maturity, mineral composition, pore volume and specific surface area of the organic matter) and the movable oil content of the mud shale, and finally established a quantitative evaluation model of the movable oil content. However, this is only for the movable oil, without considering the swollen and adsorbed crude oil, so the oil-bearing property of the mud shale cannot be comprehensively evaluated.

Under the guidance of the above theories and methods, the evaluations of the oil-bearing property of the mud shale have made great progress. On the whole, there are still three problems at present: 1) the evaluations of the oil-bearing property are mostly qualitative comparisons, and quantitative evaluations are relatively less; 2) any method for obtaining the oil-bearing property of the mud shale through a laboratory analysis inevitably has a serious light hydrocarbon loss during preservation and preparation of the samples, and a light hydrocarbon recovery should be carried out before the evaluation; and 3) actually, the mud shale can be used as either a hydrocarbon source rock or a reservoir stratum; from the perspective of the mass balance principle, the oil-bearing property of the mud shale is directly related to only two factors: (A) as a hydrocarbon source rock, whether the mud shale has reached a hydrocarbon expulsion threshold and how much the generated oil and gas is discharged (i.e. volume of discharged hydrocarbon); and (B) as a reservoir stratum, whether the mud shale is charged with external hydrocarbon, and how much external oil and gas is charged (i.e. volume of externally charged hydrocarbon).

To sum up, the prior art lacks a mature method for evaluating volumes of discharged hydrocarbon and externally charged hydrocarbon in a mud shale, which is urgently needed in the art.

SUMMARY

In view of the problems in the prior art, the present disclosure provides a method and apparatus for evaluating volumes of discharged hydrocarbon and externally charged hydrocarbon in a mud shale, which solve the defects of imperfect quantification processes and insufficient geological theories in the prior art, and achieves a prediction with a geological basis and high reliability.

In a first aspect, the present disclosure provides a method for evaluating volumes of discharged hydrocarbon and externally charged hydrocarbon in a mud shale, comprising:
determining a hydrogen index and a current hydrocarbon generation potential parameter of a mud shale in a target block based on total organic carbon test data and pyrolysis analysis test data of the mud shale;
determining an original hydrogen index of the target block mud shale based on the hydrogen index and the pyrolysis analysis test data; and
evaluating a volume of discharged hydrocarbon and a volume of externally charged hydrocarbon in the mud shale based on the current hydrocarbon generation potential parameter and the original hydrogen index.

In one embodiment, determining the hydrogen index and the current hydrocarbon generation potential parameter of the mud shale based on the total organic carbon test data and the pyrolysis analysis test data of the mud shale comprises:
performing a light hydrocarbon correction on the pyrolysis analysis test data; and
determining the current hydrocarbon generation potential parameter based on the total organic carbon test data and the pyrolysis analysis test data on which the light hydrocarbon correction has been performed.

In one embodiment, determining the original hydrogen index of the mud shale based on the hydrogen index and the pyrolysis analysis test data comprises:
classifying organic matter types of the mud shale based on the hydrogen index and the pyrolysis analysis test data; and
determining the original hydrogen index based on the organic matter types and the hydrogen index.

In one embodiment, determining the original hydrogen index based on the organic matter types and the hydrogen index comprises:
establishing evolution models of various types of kerogen of the mud shale based on the organic matter types; and
determining the original hydrogen index of the mud shale based on the evolution models and the hydrogen index.

In one embodiment, the evolution models represent variation relationships between the hydrogen indexes of various types of kerogen and the pyrolysis analysis test data.

In one embodiment, determining the original hydrogen index of the mud shale based on the evolution models and the hydrogen index comprises:
calculating hydrocarbon generation conversion rates corresponding to various types of kerogen at different thermal evolution maturities based on the evolution models; and
determining the original hydrogen index based on the hydrocarbon generation conversion rates and the hydrogen index.

In a second aspect, the present disclosure provides an apparatus for evaluating volumes of discharged hydrocarbon and externally charged hydrocarbon in a mud shale, comprising:
a hydrogen index determination module configured to determine a hydrogen index and a current hydrocarbon generation potential parameter of a mud shale based on total organic carbon test data and pyrolysis analysis test data of the mud shale;
an original hydrogen index determination module configured to determine an original hydrogen index of the mud shale based on the hydrogen index and the pyrolysis analysis test data; and
a mud shale evaluation module configured to evaluate a volume of discharged hydrocarbon and a volume of externally charged hydrocarbon in the mud shale based on the current hydrocarbon generation potential parameter and the original hydrogen index.

In one embodiment, the hydrogen index determination module comprises:
- a pyrolysis data correction unit configured to perform a light hydrocarbon correction on the pyrolysis analysis test data; and
- a current potential parameter determination unit configured to determine the current hydrocarbon generation potential parameter based on the total organic carbon test data and the pyrolysis analysis test data on which the light hydrocarbon correction has been performed.

In one embodiment, the original hydrogen index determination module comprises:
- an organic matter type classifying unit configured to classify organic matter types of the mud shale based on the hydrogen index and the pyrolysis analysis test data; and
- an original hydrogen index determination unit configured to determine the original hydrogen index based on the organic matter types and the hydrogen index.

In one embodiment, the original hydrogen index determination unit comprises:
- an evolution model establishing unit configured to establish evolution models of various types of kerogen of the mud shale based on the organic matter types; and
- an original hydrogen index determination first subunit configured to determine the original hydrogen index of the mud shale based on the evolution models and the hydrogen index.

In one embodiment, the evolution models represent variation relationships between the hydrogen indexes of various types of kerogen and the pyrolysis analysis test data.

In one embodiment, the original hydrogen index determination first subunit comprises:
- a hydrocarbon generation conversion rate calculation unit configured to calculate hydrocarbon generation conversion rates corresponding to various types of kerogen at different thermal evolution maturities based on the evolution models; and
- an original hydrogen index determination second subunit configured to determine the original hydrogen index based on the hydrocarbon generation conversion rates and the hydrogen index.

In a third aspect, the present disclosure provides an electronic device, comprising a memory, a processor, and a computer program stored in the memory and executable on the processor, wherein the processor is configured to execute the computer program to implement the steps of the method for evaluating volumes of discharged hydrocarbon and externally charged hydrocarbon in the mud shale.

In a fourth aspect, the present disclosure provides a computer-readable storage medium storing a computer program, wherein when being executed by a processor, the computer program implements the steps of the method for evaluating volumes of discharged hydrocarbon and externally charged hydrocarbon in the mud shale.

As can be seen from the above description, in the method and apparatus for evaluating volumes of discharged hydrocarbon and externally charged hydrocarbon in a mud shale provided by the embodiments of the present disclosure, firstly a hydrogen index and a current hydrocarbon generation potential parameter of a mud shale in a target block are determined based on total organic carbon test data and pyrolysis analysis test data of the target block mud shale; next, an original hydrogen index of the mud shale is determined based on the hydrogen index and the pyrolysis analysis test data; and finally, a volume of discharged hydrocarbon and a volume of externally charged hydrocarbon in the mud shale are evaluated based on the current hydrocarbon generation potential parameter and the original hydrogen index. In the present disclosure, the original hydrocarbon generation potential of the mud shale is obtained through a hydrocarbon generation evolution model, which is established by performing a numerical simulation on the data-driven model of kerogen hydrocarbon generation kinetics with the IBM-SPSS based on the geological theories; the current hydrocarbon generation potential is obtained by performing a correction on the measured pyrolysis soluble hydrocarbon volume based on a light hydrocarbon compensation correction chart; and a quantitative evaluation of the volume of discharged hydrocarbon and the volume of externally charged hydrocarbon in the mud shale is realized by calculating the difference between the original hydrocarbon generation potential and the current hydrocarbon generation potential based on the mass balance principle.

BRIEF DESCRIPTION OF DRAWINGS

For clearer illustration of the embodiments in the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

FIG. 8 illustrates evolution models representing variation of hydrocarbon generation conversion ratios TR of various types of kerogen over maximum pyrolysis peak temperature $T_{max}$ according to an embodiment of the present disclosure;

FIG. 9 illustrates a flowchart of a method for evaluating volumes of discharged hydrocarbon and externally charged hydrocarbon in a mud shale according to a specific application example of the present disclosure;

DESCRIPTION OF EMBODIMENTS

For a clearer understanding of the objectives, technical features and effects of the embodiments of the present disclosure, a clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Those skilled in the art should understand that the embodiments of this disclosure can be provided as methods, systems or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code.

It should be noted that the term 'comprise', 'have' or any other variant in the Description, claims and drawings of the present disclosure is intended to cover the non-exclusive inclusions. For example, a process, a method, a system, a product or a device comprising a series of steps or units is not necessarily limited to those steps or units clearly listed, but may comprise other steps or units not clearly listed or inherent to those processes, methods, products or devices.

It should be noted that the embodiments in the present disclosure and the features in the embodiments may be combined with each other if there is no conflict. Hereinafter, the present disclosure will be described in detail with reference to the drawings and in conjunction with the embodiments.

Figure 1:
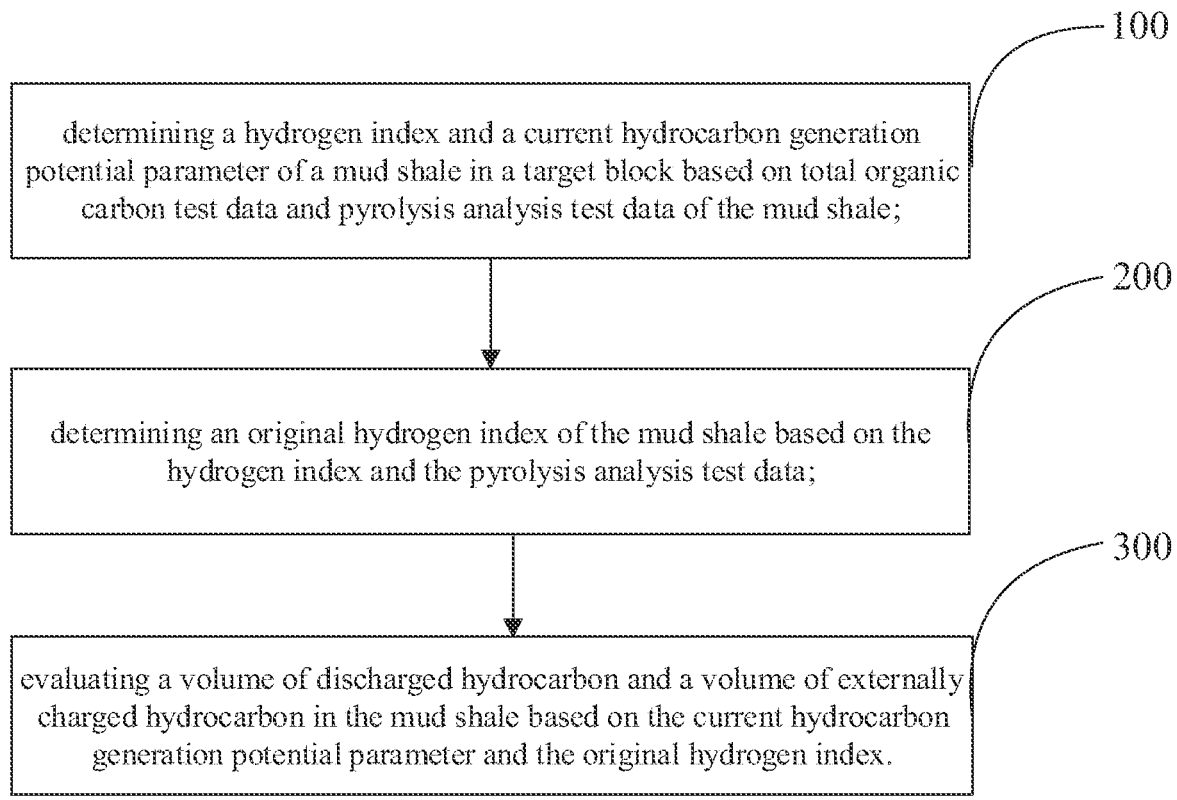
FIG. 1 illustrates a flowchart of a method for evaluating volumes of discharged hydrocarbon and externally charged hydrocarbon in a mud shale according to an embodiment of the present disclosure.

The embodiments of the present disclosure provide an implementation of a method for evaluating volumes of discharged hydrocarbon and externally charged hydrocarbon in a mud shale. Referring to FIG. 1, the method specifically comprises:

Step 100: determining a hydrogen index and a current hydrocarbon generation potential parameter of a mud shale in a target block based on total organic carbon test data and pyrolysis analysis test data of the target block mud shale.

Preferably, the total organic carbon test data comprises a total organic carbon content, and the pyrolysis test data comprises a pyrolysis soluble hydrocarbon volume, a pyrolysis hydrocarbon volume, and a maximum pyrolysis peak temperature.

On the other hand, before the step 100, it may be necessary to carry out a total organic carbon test and a pyrolysis analysis test on a core of the mud shale to obtain the total organic carbon test data and the pyrolysis analysis test data.

Step 200: determining an original hydrogen index of the target block mud shale based on the hydrogen index and the pyrolysis analysis test data.

Specifically, the original hydrogen index may be calculated according to Formula (1):

$$HIo = HI/(1-TR) \quad (1)$$

wherein HIo denotes the original hydrogen index, HI denotes the hydrogen index, and TR (unit: %) denotes a hydrocarbon generation conversion rate corresponding to each pyrolysis peak temperature.

Step 300: evaluating a volume of discharged hydrocarbon and a volume of externally charged hydrocarbon in the mud shale based on the current hydrocarbon generation potential parameter and the original hydrogen index.

Specifically, since the oil-bearing property of the mud shale is controlled by the volume of discharged hydrocarbon of the mud shale itself and the volume of externally charged hydrocarbon, the volume of discharged hydrocarbon and the volume of externally charged hydrocarbon are quantitatively evaluated in step 300 based on a mass balance principle. Then whether to perform oil production on the target block can be determined based on the volume of discharged hydrocarbon and the volume of externally charged hydrocarbon in the mud shale.

As can be seen from the above description, during the implementation of the method provided by the embodiments of the present disclosure, it is possible to quantitatively evaluate the volume of discharged hydrocarbon and the volume of externally charged hydrocarbon in the mud shale with the assistance of the typical and conventional numerical simulation technology, the support of the geological theories, and the means of advanced mathematical methods. The present disclosure solves the defects of imperfect quantification processes and insufficient geological theories in the prior art, and achieves a prediction with a geological basis and high reliability, a prediction with an advanced technology and high accuracy, and a prediction with a new idea and strong innovation. In addition, this method only uses the total organic carbon test data and the pyrolysis test data of the mud shale, which is simple, easy and strongly operable. Specifically, this method, which is verified by practical applications, has the following advantageous effects: (1) a sufficient geological basis and high reliability; (2) distinctive technical characteristics and high accuracy; (3) a complete and clear idea and strong innovation; and (4) easy-to-obtain information and strong operability.

Figure 2:
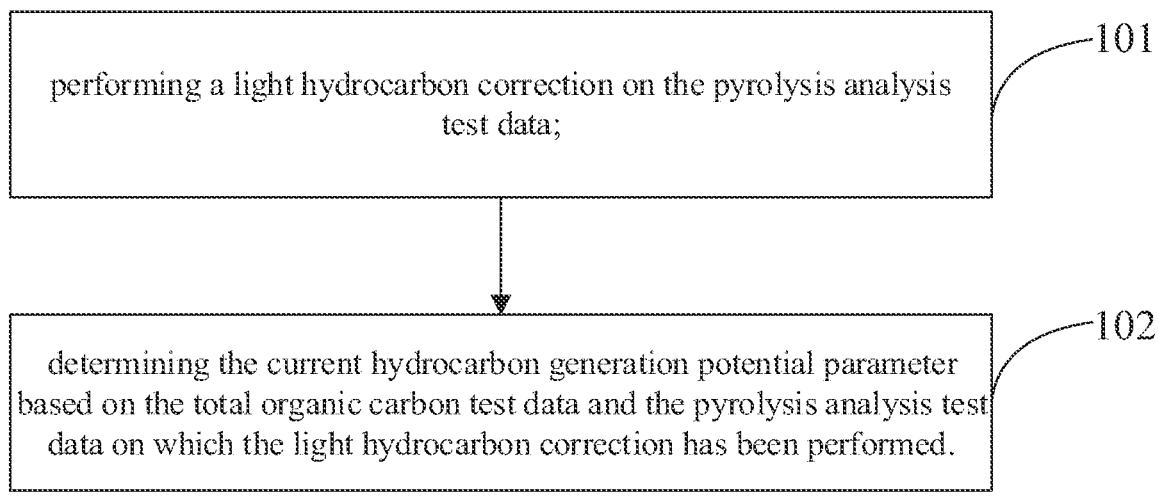
FIG. 2 illustrates a flowchart of step 100 according to an embodiment of the present disclosure.

In one embodiment, referring to FIG. 2, step 100 further comprises:

Step 101: performing a light hydrocarbon correction on the pyrolysis analysis test data.

Specifically, a light hydrocarbon correction is performed on the pyrolysis analysis test data based on a light hydrocarbon compensation correction chart of a mud shale core, so as to recover and obtain an actual pyrolysis soluble hydrocarbon volume of the mud shale core.

Step 102: determining the current hydrocarbon generation potential parameter based on the total organic carbon test data and the pyrolysis analysis test data on which the light hydrocarbon correction has been performed.

A current hydrocarbon generation potential Amp of the mud shale core is calculated based on a total organic carbon content TOC, a pyrolysis hydrocarbon volume $S_2$, and a pyrolysis soluble hydrocarbon volume $S_{1C}$ of the mud shale core on which the light hydrocarbon correction has been performed, and the specific calculation formula is:

$$I_{HGP}=(S_{1C}\pm S_2)/TOC\times 100 \qquad (2)$$

Figure 3:
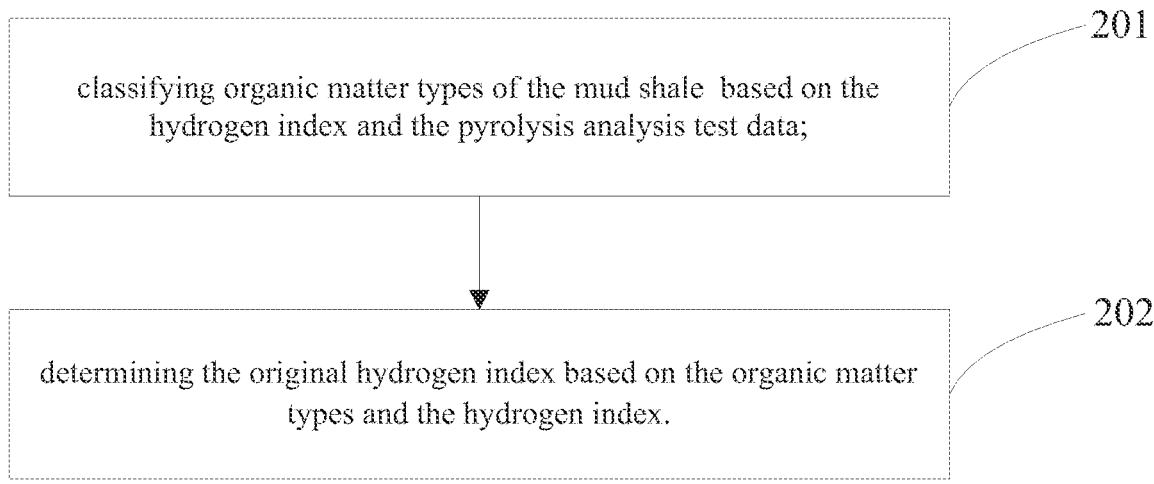
FIG. 3 illustrates a flowchart of step 200 according to an embodiment of the present disclosure.
Figure 4:
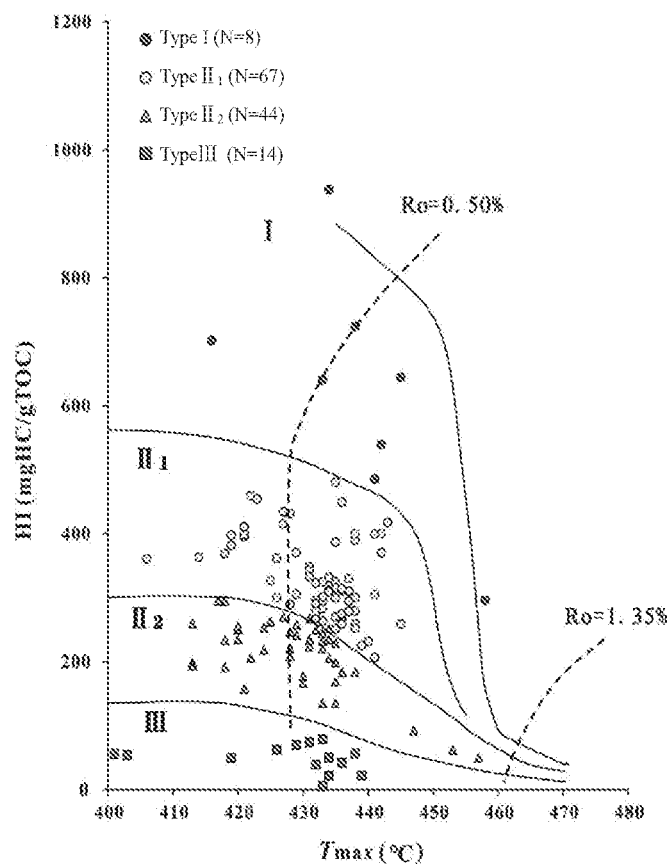
FIG. 4 illustrates a schematic diagram of an organic matter type classification chart of a hydrogen index HI and a maximum pyrolysis peak temperature $T_{max}$ according to an embodiment of the present disclosure.

In one embodiment, referring to FIG. 3, step 200 further comprises:

Step 201: classifying organic matter types of the mud shale based on the hydrogen index and the pyrolysis analysis test data;

Referring to FIG. 4, a scatter diagram of HI and $T_{max}$ is made based on the hydrogen index HI and the maximum pyrolysis peak temperature $T_{max}$; and organic matter types of the mud shale core are classified based on a HI-$T_{max}$ organic matter type classification chart.

Step 202: determining the original hydrogen index based on the organic matter types and the hydrogen index.

Figure 5:
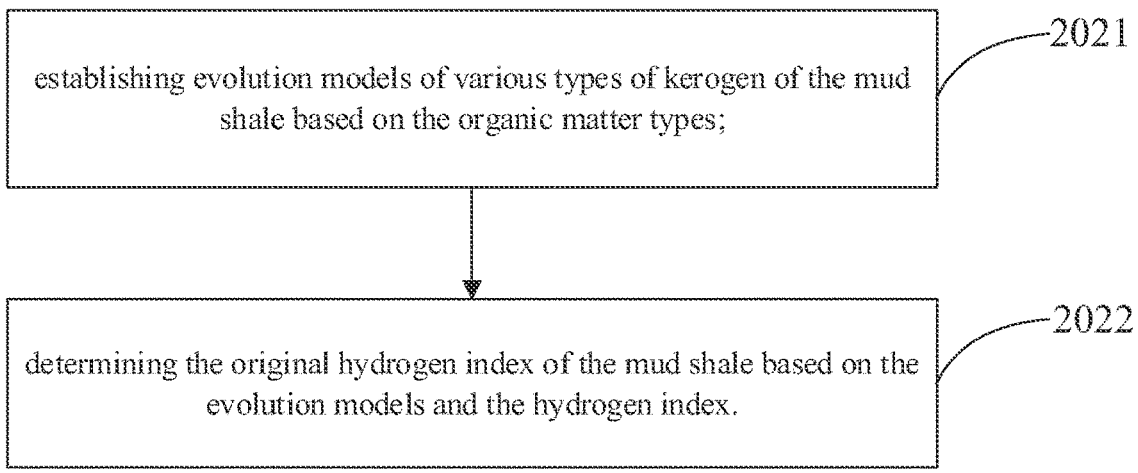
FIG. 5 illustrates a flowchart of step 202 according to an embodiment of the present disclosure.

In one embodiment, referring to FIG. 5, step 202 further comprises:

Step 2021: establishing evolution models of various types of kerogen of the mud shale based on the organic matter types.

Figure 6:
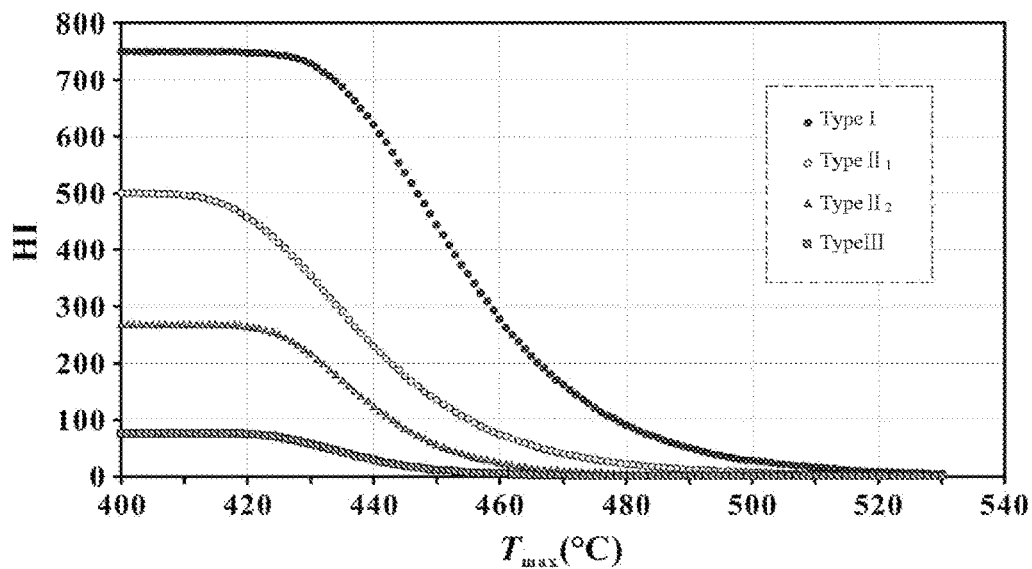
FIG. 6 illustrates evolution models representing variation of hydrogen indexes HI of various types of kerogen over a maximum pyrolysis peak temperature $T_{max}$ according to an embodiment of the present disclosure.

Based on the classified organic matter types, a numerical simulation is performed on a data-driven model of kerogen hydrocarbon generation kinetics, so as to establish evolution models representing variation of HI of various types of kerogen over $T_{max}$, as illustrated in FIG. 6. The established evolution models of various types of kerogen are:

$$\text{Type } I \text{ kerogen:HI} = 750\times\left[1-\exp\left\{-\left(\frac{T_{max}}{448}\right)^{-30}\right\}\right] \qquad (3)$$

$$\text{Type } II_1 \text{ kerogen:HI} = 500\times\left[1-\exp\left\{-\left(\frac{T_{max}}{433}\right)^{-30}\right\}\right] \qquad (4)$$

$$\text{Type } II_2 \text{ kerogen:HI} = 270\times\left[1-\exp\left\{-\left(\frac{T_{max}}{435}\right)^{-42}\right\}\right] \qquad (5)$$

$$\text{Type } III \text{ kerogen:HI} = 76\times\left[1-\exp\left\{-\left(\frac{T_{max}}{433}\right)^{-47}\right\}\right] \qquad (6)$$

Step 2022: determining the original hydrogen index of the mud shale based on the evolution models and the hydrogen index.

In one embodiment, the evolution models represent variation relationships between the hydrogen indexes of various types of kerogen and the pyrolysis analysis test data.

Specifically, the evolution models represent evolution relationships between HI of various types of kerogen and $T_{max}$.

Figure 7:
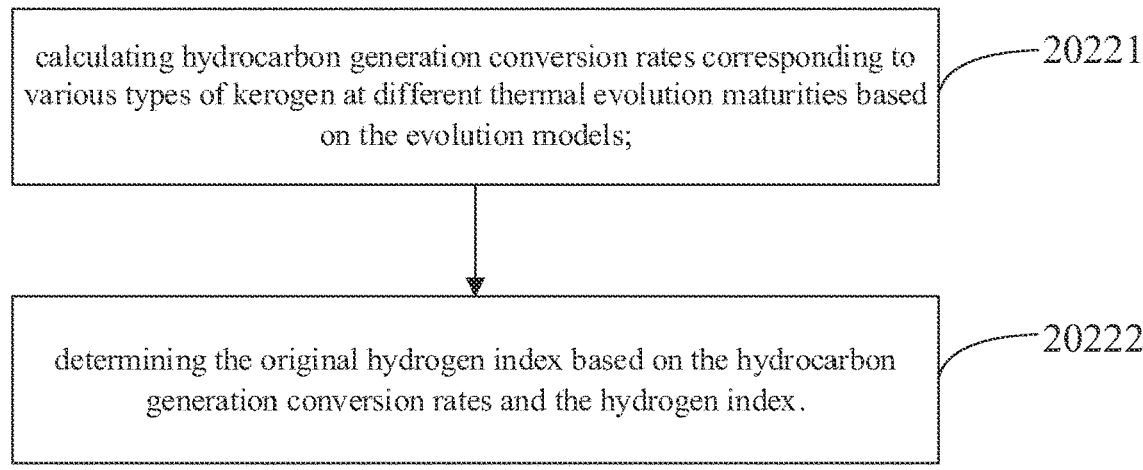
FIG. 7 illustrates a flowchart of step 2022 according to an embodiment of the present disclosure.

In one embodiment, referring to FIG. 7, step 2022 further comprises:

Step 20221: calculating hydrocarbon generation conversion rates corresponding to various types of kerogen at different thermal evolution maturities based on the evolution models;

Step 20222: determining the original hydrogen index based on the hydrocarbon generation conversion rates and the hydrogen index.

In steps 20221 and 20222, the hydrocarbon generation conversion rates TR corresponding to various types of kerogen at different thermal evolution maturities are calculated based on the established evolution models representing variation of HI of various types of kerogen over $T_{max}$, as illustrated in FIG. 8. Specifically, formula (7) is adopted for calculation:

$$TR=[HI_o-HI_x]/HI_o \qquad (7)$$

wherein $HI_o$ (unit: mg HC/g TOC) denotes the original hydrogen index of the mud shale; HA (unit: mg HC/g TOC) denotes the simulated HI corresponding to different pyrolysis peak temperatures $T_{max}$ in the evolution models representing variation of HI over $T_{max}$; and TR (unit: %) denotes the hydrocarbon generation conversion rates corresponding to different pyrolysis peak temperatures.

Next, the original hydrogen index $HI_o$ of the mud shale core is calculated based on HI of the mud shale core and TR corresponding to different pyrolysis peak temperatures $T_{max}$, and the specific calculation formula is formula (1).

In the method provided by the embodiments of the present disclosure, since the oil-bearing property of the mud shale is controlled by the volume of discharged hydrocarbon of the mud shale itself and the volume of externally charged hydrocarbon, the volume of discharged hydrocarbon and the volume of externally charged hydrocarbon in the mud shale core are quantitatively evaluated only with the easily acquirable total organic carbon test data and pyrolysis test data based on the mass balance principle. The method breaks through a bottleneck problem that the quantitative evaluation of the volume of discharged hydrocarbon and the volume of externally charged hydrocarbon in the mud shale is difficult in the prior art, evaluates the volume of discharged hydrocarbon and the volume of externally charged hydrocarbon in the mud shale core of a mud shale oil system more objectively and more accurately, and has great guiding significance for the evaluation of the oil-bearing property of the mud shale. Specifically, in the embodiments of the present disclosure, the organic matter types are classified using the data such as the total organic carbon content TOC, the pyrolytic soluble hydrocarbon volume $S_1$, the pyrolytic hydrocarbon volume $S_2$ and the maximum pyrolysis peak temperature $T_{max}$ of the mud shale core; the evolution models representing variation of the hydrogen indexes HI over the maximum pyrolysis peak temperature $T_{max}$ are nonlinearly fitted by means of IBM-SPSS; and the quantitative evaluation technology and method of the volume of discharged hydrocarbon and the volume of externally charged hydrocarbon in the mud shale are established based on the mass balance principle.

To sum up, the present disclosure solves the difficulty in the quantitative evaluation of the oil-bearing property of the mud shale in prior art, especially the difficulty in the quantitative evaluation of the volume of discharged hydrocarbon and the volume of externally charged hydrocarbon in the mud shale, while quantitatively evaluates the volume of discharged hydrocarbon and the volume of externally charged hydrocarbon in the mud shale more objectively, more quickly and more reliably, and achieves positive results in the exploration and development of mud shale oil resources in oilfields.

In order to further describe the solution, the present disclosure also takes the mud shale core of the Permian Fengcheng Formation in Mahu Sag, Junggar Basin, western China as an example, to provide a specific application example of the method of the present disclosure, as illustrated in FIG. 9, which specifically comprises the following contents.

Step S1: obtaining data of a total organic carbon content TOC, a pyrolysis soluble hydrocarbon volume $S_1$, a pyrolytic hydrocarbon volume $S_2$ and a maximum pyrolysis peak temperature $T_{max}$ of a mud shale core through a total organic carbon test and a pyrolysis analysis test.

Specifically, the data of the total organic carbon content TOC is obtained through a total organic carbon test of a mud shale core in a research area; the data of the pyrolysis soluble hydrocarbon volume $S_1$, the pyrolysis hydrocarbon volume $S_2$, and the maximum pyrolysis peak temperature $T_{max}$ are obtained by pyrolysis experiments of the mud shale core.

This embodiment selects the mud shale core of the Permian Fengcheng Formation in Mahu Sag, Junggar Basin, western China, and totally obtains 133 mud shale core samples of the Fengcheng Formation in Marcellus mud shale-1 Well. The embodiment obtains the total organic carbon content TOC, the pyrolysis soluble hydrocarbon volume $S_1$, the pyrolytic hydrocarbon volume $S_2$, and the maximum pyrolysis peak temperature $T_{max}$ of the mud shale core through the total organic carbon test and the pyrolysis analysis test so as to calculate the hydrogen index HI of the mud shale core. Specifically, the hydrogen index HI is calculated based on the measured TOC and $S_2$ of the mud shale core, and the specific calculation formula is:

$$HI = S_2/TOC \times 100;$$

Step S2: making a scatter diagram of HI and $T_{max}$ based on HI and $T_{max}$ of the mud shale core obtained in step S1, and classifying the organic matter types of the mud shale core based on an HI-$T_{max}$ organic matter type classification chart, as illustrated in FIG. 4.

Step S3: performing a numerical simulation on a data-driven model of kerogen hydrocarbon generation kinetics based on the organic matter types classified in step S2, so as to establish evolution models representing variation of HI of various types of kerogen over $T_{max}$.

Preferably, the data-driven model of kerogen hydrocarbon generation kinetics is a conceptual model proposed by Chen Z. H. et al. (A data driven model for studying kerogen kinetics with application examples from Canadian sedimentary basins [J]. Marine and Petroleum Geology, 2015(67): 795-803), and the specific formula is:

$$HI = HI_o[1 - \exp\{-(T_{max}/\beta)^\theta\}] + c$$

wherein $HI_o$ (unit: mg HC/g TOC) denotes the original hydrogen index of the mud shale; HI (unit: mg HC/g TOC) denotes hydrogen index; $T_{max}$ (unit: °C.) denotes the maximum pyrolysis peak temperature; $\beta$ and $\theta$ denote dimensionless variables related to the kerogen hydrocarbon generation kinetics; and c is a dimensionless constant; and wherein $\beta$, $\theta$ and c are all obtained by nonlinear fitting of the pyrolysis data.

As illustrated in FIG. 6, the established evolution models of various types of kerogen are:

$$\text{Type } I \text{ kerogen:} HI = 750 \times \left[1 - \exp\left\{-\left(\frac{T_{max}}{448}\right)^{-30}\right\}\right]$$

$$\text{Type } II_1 \text{ kerogen:} HI = 500 \times \left[1 - \exp\left\{-\left(\frac{T_{max}}{433}\right)^{-30}\right\}\right]$$

$$\text{Type } II_2 \text{ kerogen:} HI = 270 \times \left[1 - \exp\left\{-\left(\frac{T_{max}}{435}\right)^{-42}\right\}\right]$$

$$\text{Type } III \text{ kerogen:} HI = 76 \times \left[1 - \exp\left\{-\left(\frac{T_{max}}{433}\right)^{-47}\right\}\right]$$

The hydrocarbon generation conversion rates TR corresponding to various types of kerogen at different thermal evolution maturities are calculated based on the established evolution models representing variation of HI of various types of kerogen over $T_{max}$, as illustrated in FIG. 8. The specific calculation formula is:

$$TR = [HI_o - HI_x]/HI_o;$$

wherein $HI_o$ (unit: mg HC/g TOC) denotes the original hydrogen index of the mud shale; HA denotes the simulated HI corresponding to different pyrolysis peak temperatures HI in the evolution models representing variation of HI over $T_{max}$; and TR (unit: %) denotes the hydrocarbon generation conversion rates corresponding to different pyrolysis peak temperatures.

Step S4: calculating the original hydrogen index $HI_o$ of the mud shale core based on HI of the mud shale core obtained in step S1 and TR corresponding to various pyrolysis peak temperatures $T_{max}$ obtained in step S3, and the specific calculation formula is:

$$HI_o = HI/(1-TR)$$

Step S5: calculating the pyrolysis soluble hydrocarbon volume Sic of the mud shale core on which the light hydrocarbon correction has been performed based on a light hydrocarbon compensation correction chart of a mud shale core proposed by Xue Haitao et al. (Selection and Verification of Key Parameters in the Quantitative Evaluation of Shale Oil: A Case Study at the Qingshankou Formation, Northern Songliao Basin [J]. Bulletin of Mineralogy, Petrology and Geochemistry, 2015(01):70-78).

The current hydrocarbon generation potential $I_{HGP}$ of the mud shale core is calculated based on the total organic carbon content TOC and the pyrolysis hydrocarbon volume $S_2$ obtained in step S1 and the pyrolysis soluble hydrocarbon volume $S_{1C}$ of the mud shale core on which the light hydrocarbon correction has been performed and obtained in step S5, and the specific calculation formula is:

$$I_{HGP} = (S_{1C} + S_2)/TOC \times 100$$

Step S6: calculating volume of discharged/externally-charged hydrocarbon $\Delta Q$ based on the original hydrogen index $HI_o$ of the mud shale core obtained in step S4 and the current hydrocarbon generation potential $I_{HGP}$ of the mud shale core obtained in step S5.

Figure 10:
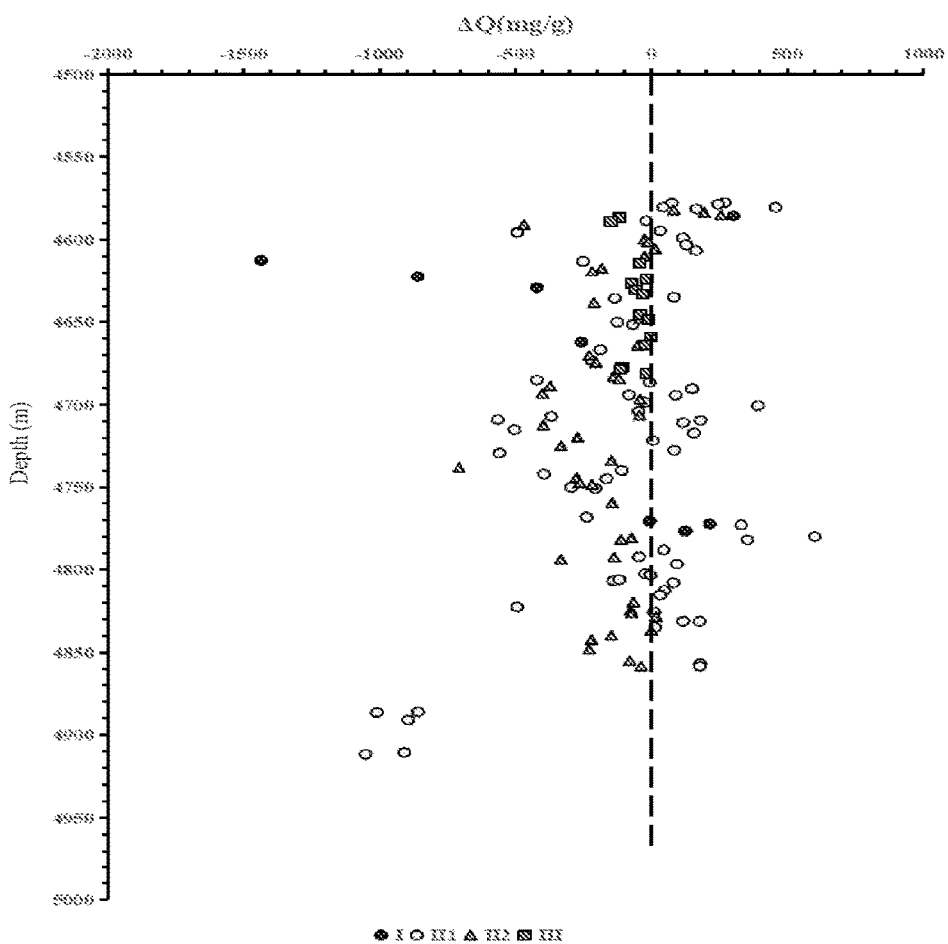
FIG. 10 illustrates a diagram of a relationship between volumes of discharged/externally charged hydrocarbon ΔQ in mud shale cores of various types of kerogen mud shales and depths of the mud shale cores in a target block according to a specific application example of the present disclosure.

Based on the mass balance principle, the volume of discharged/externally-charged hydrocarbon $\Delta Q$ in the mud shale core is calculated based on $HI_o$ and $I_{HGP}$ of all mud shale core samples, as illustrated in FIG. 10. The specific calculation formula is:

$$\Delta Q = HI_o - I_{HGP};$$

wherein, $\Delta Q < 0$ indicates that the mud shale core has been charged with external migration hydrocarbon, and an absolute value of the $\Delta Q$ is the volume of external migration hydrocarbon, wherein the larger the absolute value is, the more the migration hydrocarbon is; and $\Delta Q > 0$ indicates that the mud shale core has discharged hydrocarbon, and an absolute value of the $\Delta Q$ is the volume of the hydrocarbon that has been discharged, which is called discharged hydrocarbon, wherein the larger the absolute value is, the more the discharged hydrocarbon is.

Finally, the quantitative evaluation of the volume of the discharged hydrocarbon and the volume of externally charged hydrocarbon in the mud shale core in the research area is realized based on a calculation result in step S6.

As can be seen from the above description, the present disclosure provides a method for evaluating volumes of discharged hydrocarbon and externally charged hydrocarbon in a mud shale, so as to solve the difficulty in the quantitative evaluation of the volume of the discharged hydrocarbon and the volume of external migration hydrocarbon in the mud shale, and provide an important technical support for the evaluation of the oil-bearing property of the mud shale. The method utilizes data of a total organic carbon content TOC, a pyrolysis soluble hydrocarbon volume $S_1$, a pyrolysis hydrocarbon volume $S_2$ and a maximum pyrolysis peak temperature $T_{max}$ of a mud shale core, depends on a rule that the oil-bearing property of the mud shale is controlled by a volume of the discharged hydrocarbon of the mud shale itself and a volume of externally charged hydrocarbon, and is based on a mass balance principle. The method comprises: determining a hydrogen index and a current hydrocarbon generation potential parameter of a mud shale in a target block based on total organic carbon test data and pyrolysis analysis test data of the mud shale; determining an original hydrogen index of the mud shale based on the hydrogen index and the pyrolysis analysis test data; and evaluating a volume of discharged hydrocarbon and a volume of externally charged hydrocarbon in the mud shale based on the current hydrocarbon generation potential parameter and the original hydrogen index.

To sum up, in view of the difficulty in the quantitative evaluation of the oil-bearing property of the mud shale in the prior art, especially the difficulty in the quantitative evaluation of the volume of discharged hydrocarbon and the volume of externally charged hydrocarbon in the mud shale, the present disclosure establishes, based on the mass balance principle, a corresponding quantitative evaluation procedure and method utilizing the rule that the oil-bearing property of the mud shale is controlled by the volume of discharged hydrocarbon of the mud shale itself and the volume of externally charged hydrocarbon, thereby quantitatively evaluating the volume of discharged hydrocarbon and the volume of externally charged hydrocarbon in the mud shale. For the evaluation of the oil-bearing property of the mud shale oil system, the volume of discharged hydrocarbon and the volume of charged hydrocarbon in the mud shale can be evaluated more objectively, more conveniently and more accurately based on the mass balance principle, Therefore the method of the present disclosure is widely applicable.

Based on the same inventive concept, the embodiments of the present disclosure further provide an apparatus for evaluating volumes of discharged hydrocarbon and externally charged hydrocarbon in a mud shale, which can implement the method described in the above embodiments, and will be described in the following embodiments. Since the principle of technical solution of the apparatus is similar to that of the method, the method as described above may be referred to for implementation of the apparatus, and the repetitive description is omitted herein. As used hereinafter, the term 'unit' or 'module' may be a combination of software and/or hardware realizing a predetermined function. Although a system described in the following embodiments is preferably implemented in software, the implementation with hardware or a combination of software and hardware is also possible and conceivable.

Figure 11:
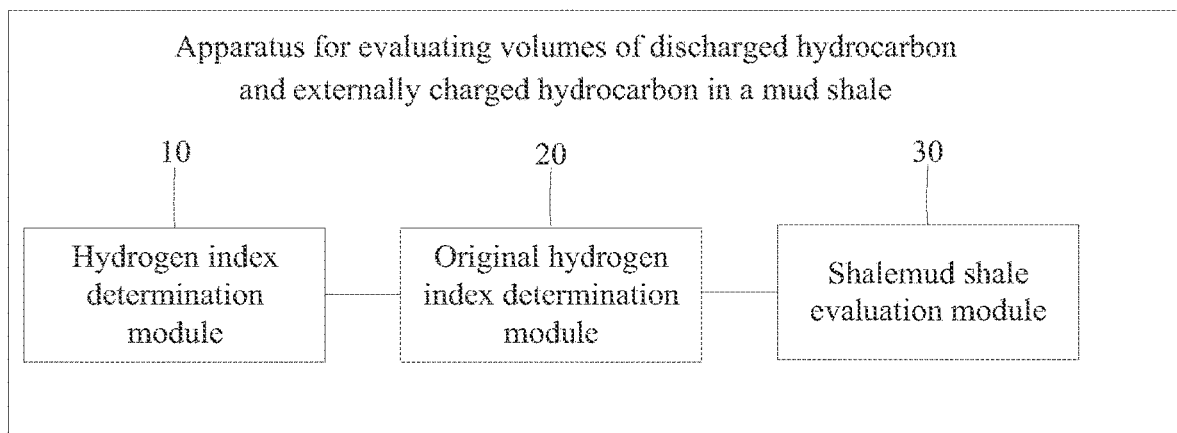
FIG. 11 illustrates a schematic diagram of an apparatus for evaluating volumes of discharged hydrocarbon and externally charged hydrocarbon in a mud shale according to an embodiment of the present disclosure.

The embodiments of the present disclosure provide an implementation of an apparatus capable of implementing the method of for evaluating volumes of discharged hydrocarbon and externally charged hydrocarbon in a mud shale. Referring to FIG. 11, the apparatus mud shale specifically comprises:

a hydrogen index determination module 10 configured to determine a hydrogen index and a current hydrocarbon generation potential parameter of a mud shale in a target block based on total organic carbon test data and pyrolysis analysis test data of the mud shale;

an original hydrogen index determination module 20 configured to determine an original hydrogen index of the mud shale based on the hydrogen index and the pyrolysis analysis test data; and a mud shale evaluation module 30 configured to evaluate a volume of discharged hydrocarbon and a volume of externally charged hydrocarbon in the mud shale based on the current hydrocarbon generation potential parameter and the original hydrogen index.

Figure 12:
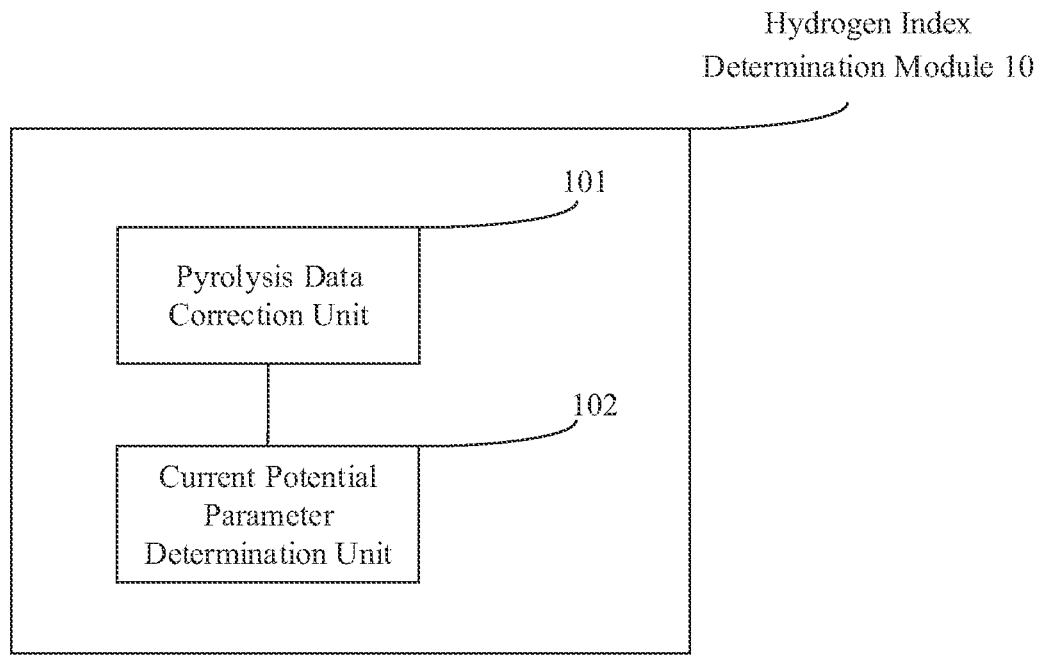
FIG. 12 illustrates a constitutional diagram of a hydrogen index determination module 10 according to an embodiment of the present disclosure.

In one embodiment, referring to FIG. 12, the hydrogen index determination module 10 comprises:

a pyrolysis data correction unit 101 configured to perform a light hydrocarbon correction on the pyrolysis analysis test data; and a current potential parameter determination unit 102 configured to determine the current hydrocarbon generation potential parameter based on the total organic carbon test data and the pyrolysis analysis test data on which the light hydrocarbon correction has been performed.

Figure 13:
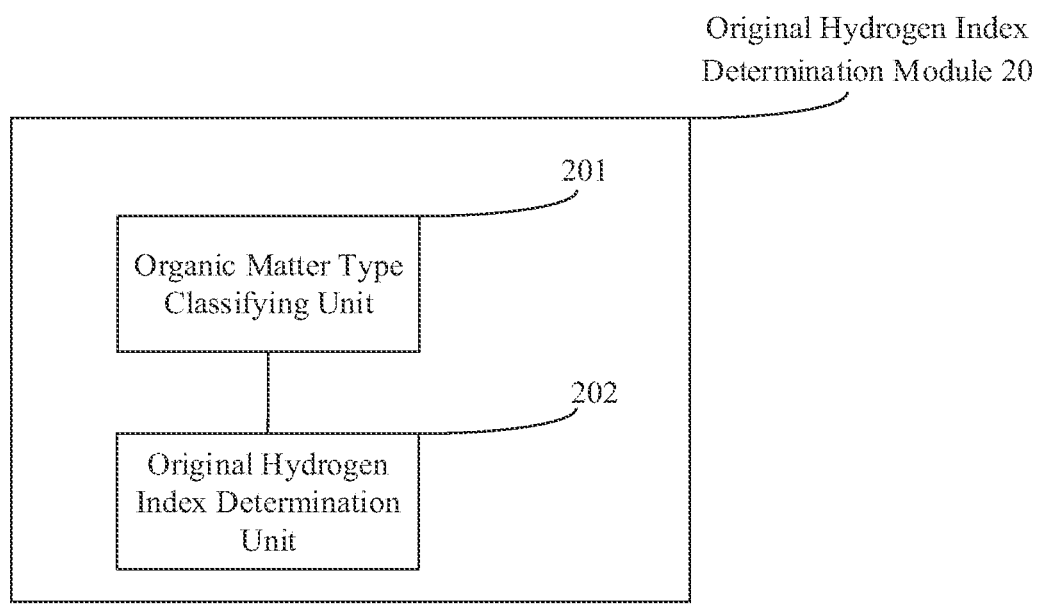
FIG. 13 illustrates a constitutional diagram of an original hydrogen index determination module 20 according to an embodiment of the present disclosure.

In one embodiment, referring to FIG. 13, the original hydrogen index determination module 20 comprises:

an organic matter type classifying unit 201 configured to classify organic matter types of the mud shale based on the hydrogen index and the pyrolysis analysis test data; and an original hydrogen index determination unit 202 configured to determine the original hydrogen index based on the organic matter types and the hydrogen index.

Figure 14:
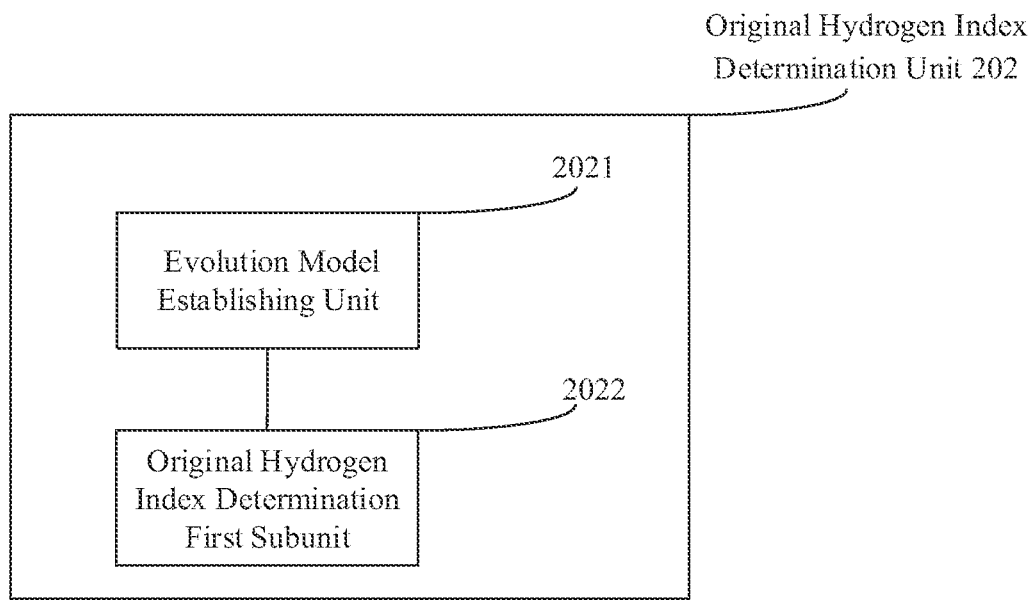
FIG. 14 illustrates a constitutional diagram of an original hydrogen index determination unit 202 according to an embodiment of the present disclosure.

In one embodiment, referring to FIG. 14, the original hydrogen index determination unit 202 comprises:

an evolution model establishing unit 2021 configured to establish evolution models of various types of kerogen of the mud shale based on the organic matter types; and an original hydrogen index determination first subunit 2022 configured to determine the original hydrogen index of the mud shale based on the evolution models and the hydrogen index.

In one embodiment, the evolution models represent variation relationships between the hydrogen indexes of various types of kerogen and the pyrolysis analysis test data.

Figure 15:
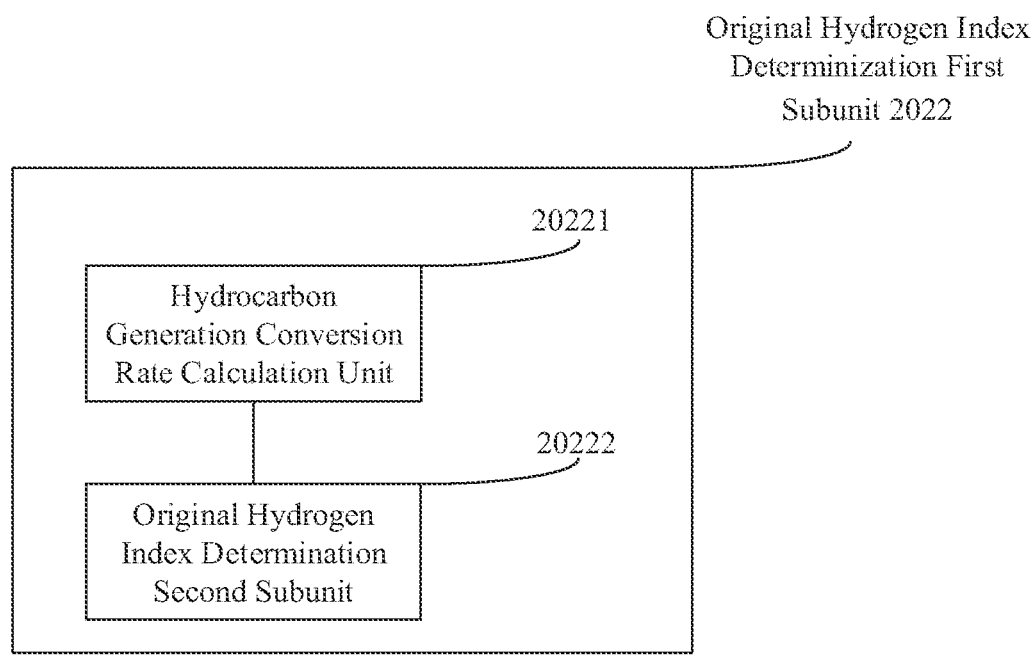
FIG. 15 illustrates a constitutional diagram of an original hydrogen index determination first subunit 2022 according to an embodiment of the present disclosure.

In one embodiment, referring to FIG. 15, the original hydrogen index determination first subunit 2022 comprises:

a hydrocarbon generation conversion rate calculation unit 20221 configured to calculate hydrocarbon generation conversion rates corresponding to various types of kerogen at different thermal evolution maturities based on the evolution models; and an original hydrogen index determination second subunit 20222 configured to determine the original hydrogen index based on the hydrocarbon generation conversion rates and the hydrogen index.

As can be seen from the above description, in the method provided by the embodiments of the present disclosure, firstly a hydrogen index and a current hydrocarbon generation potential parameter of a mud shale are determined based on total organic carbon test data and pyrolysis analysis test data of the mud shale; next, an original hydrogen index of the mud shale is determined based on the hydrogen index and the pyrolysis analysis test data; and finally, a volume of discharged hydrocarbon and a volume of externally charged hydrocarbon in the mud shale are evaluated based on the current hydrocarbon generation potential parameter and the original hydrogen index.

In the present disclosure, the original hydrocarbon generation potential of the mud shale is obtained through a hydrocarbon generation evolution model, which is established by performing a numerical simulation on the data-driven model of kerogen hydrocarbon generation kinetics with the IBM-SPSS based on the geological theories; the current hydrocarbon generation potential is obtained by performing a correction on the measured pyrolysis soluble hydrocarbon volume based on a light hydrocarbon compensation correction chart; and a quantitative evaluation of the volume of discharged hydrocarbon and the volume of externally charged hydrocarbon in the mud shale is realized by calculating the difference between the original hydrocarbon generation potential and the current hydrocarbon generation potential based on the mass balance principle.

Figure 16:
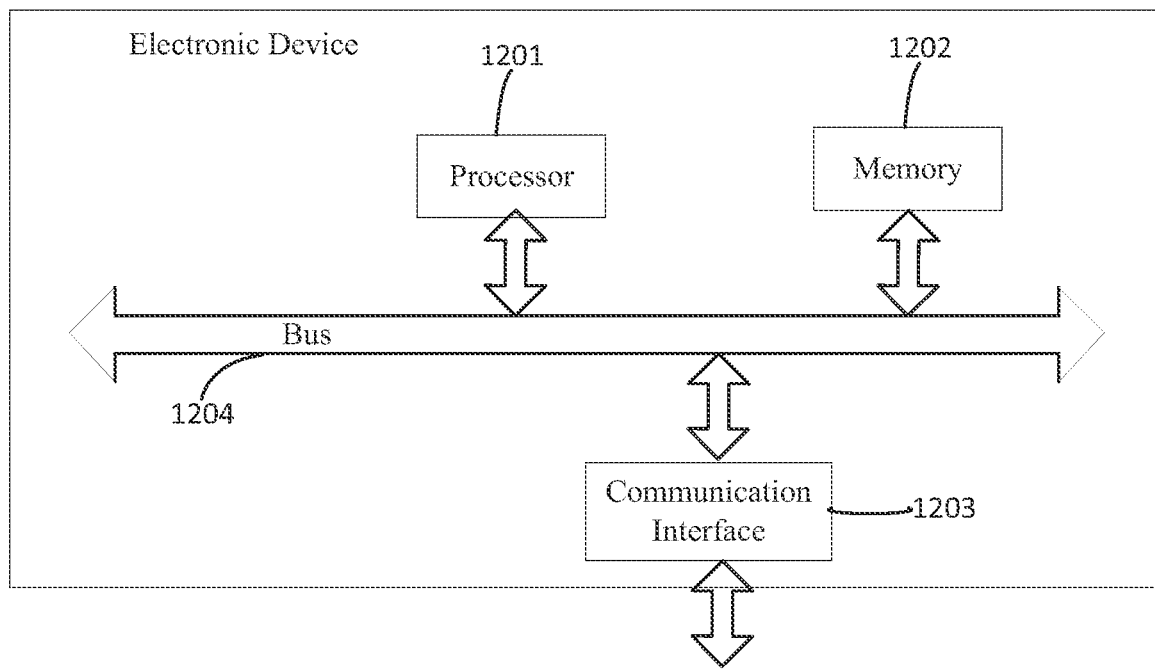
FIG. 16 illustrates a structural diagram of an electronic device according to an embodiment of the present disclosure.

The embodiments of the present disclosure further provide an implementation of an electronic device capable of implementing all steps in the method according to the above embodiments. Referring to FIG. 16, the electronic device specifically comprises:

a processor 1201, a memory 1202, a communications interface 1203 and a bus 1204;

wherein the processor 1201, the memory 1202 and the communication interface 1203 are communicated with each other through the bus 1204; the communication interface 1203 is configured to realize an information transmission between relevant devices such as a server device and a client device;

the processor 1201 is configured to call a computer program in the memory 1202 and execute the computer program for implementing all steps in according to the above embodiments; for example, the processor executes the computer program for implementing the following steps:

Step 100: determining a hydrogen index and a current hydrocarbon generation potential parameter of a mud shale in a target block based on total organic carbon test data and pyrolysis analysis test data of the mud shale;

Step 200: determining an original hydrogen index of the mud shale based on the hydrogen index and the pyrolysis analysis test data; and Step 300: evaluating a volume of discharged hydrocarbon and a volume of externally charged hydrocarbon in the mud shale based on the current hydrocarbon generation potential parameter and the original hydrogen index.

The embodiments of the present disclosure further provide a computer-readable storage medium capable of implementing all steps in the method according to the above embodiments. The computer-readable storage medium stores a computer program which, when being executed by a processor, implements all steps in the method according to the above embodiments; for example, when being executed by the processor, the computer program implements the following steps:

Step 100: determining a hydrogen index and a current hydrocarbon generation potential parameter of a mud shale in a target block based on total organic carbon test data and pyrolysis analysis test data of the mud shale;

Step 200: determining an original hydrogen index of the mud shale based on the hydrogen index and the pyrolysis analysis test data; and Step 300: evaluating a volume of discharged hydrocarbon and a volume of externally charged hydrocarbon in the mud shale based on the current hydrocarbon generation potential parameter and the original hydrogen index.

The various embodiments of the present disclosure are described in a progressive manner, and the same or similar parts between the various embodiments may be referred to each other, and each embodiment focuses on the differences from the other embodiments. In particular, the hardware and program embodiments are simply described since it is substantially similar to the method embodiment, and please refer to the description of the method embodiment for the relevant content.

The particular embodiments of the present disclosure have been described above. Other embodiments are within the scope of the appended claims. In some cases, the actions or steps recited in the claims may be performed in a different sequence than in the embodiments and still achieve the desired result. In addition, the processes depicted in the accompanying drawings do not necessarily require the particular order or sequential order shown, to achieve desirable results. In certain implementations, multitasking and parallel processing may be possible or may be advantageous.

Although the present disclosure provides the method operations as described in the embodiments or flowcharts, more or fewer operations may be included based on conventional or non-inventive efforts. The order of operations listed in the embodiments is only one of the many orders of execution and does not meant to be the only order of execution. When an actual device or terminal product is executed, execution can be performed sequentially or in parallel according to the order described in the method of the embodiments or accompanying drawings (e.g., in parallel processors, or multi-threaded environment).

For the sake of description, when the above apparatus is described, the functions are divided into various modules and described separately. Apparently, the functions of the modules can be implemented in one or more software and/or hardware components. A module realizing a function may also be implemented by a combination of multiple sub-modules or sub-units. The implementations of the apparatus described above are merely illustrative. For example, a division of units are just for a logical division of functions. Another way of division can exist in an actual implementation. For example, a plurality of units or components may be combined or integrated into another system, or some features may be omitted, or not executed. In addition, the mutual coupling or direct coupling or communication connection illustrated or discussed may be indirect coupling or communication connections through some interfaces, means or units, and may be in electrical, mechanical or other forms.

One skilled in the art also knows that there are other methods implementing a controller in addition to pure computer readable program codes. Logic programming of the methods may be performed to implement the same functionalities using a way such as controlling logic gates, switches, application specific integrated circuits, programmable logic controllers, and embedded microcontrollers. Therefore, this controller may be considered to be a hardware component, and include modules for implementing various functions being considered as a part of hardware structures. Alternatively, those apparatuses for implementing various functions may even be considered as not only software modules for implementing a method, but also the hardware structures.

In a typical configuration, the computing device comprises one or more processors (CPUs), an input/output interface, a network interface and a memory.

The memory may include a form of computer readable medium such as a volatile memory, a Random-Access Memory (RAM) and/or a non-volatile memory, such as Read-Only Memory (ROM) or a flash RAM. The memory is an example of the computer readable medium.

The present disclosure may be described in the general context of computer-executable instructions executed by the computer, such as program modules. In general, program modules include routines, programs, objects, components, data structures, etc., that perform a particular task or implementing a particular abstract data type. The embodiments of the present disclosure may also be implemented in a distributed computing environment. In these distributed computing environments, tasks are performed by a remote processing device connected via a communication network. In a distributed computing environments, the program modules may be located in local and remote computer storage media, including storage devices.

The various embodiments of the present disclosure are described in a progressive manner, and the same or similar parts between the various embodiments may be referred to each other, and each embodiment focuses on the differences from the other embodiments. In particular, the system embodiment is simply described since it is substantially similar to the method embodiment, and please refer to the description of the method embodiment for the relevant content. In the description of the present disclosure, the description of reference terms 'one embodiment', 'some embodiments', 'an example', 'a specific example' or 'some examples' and the like mean that the specific features, structures, materials, or characteristics described in conjunction with the embodiment(s) or example(s) are comprised in at least one embodiment or example of the present disclosure. In the present disclosure, the schematic expressions of the above terms do not necessarily aim at the same embodiment or example. Moreover, the specific features, structures, materials, or characteristics described may be combined in any one or more embodiments or examples in a suitable manner. In addition, a person skilled in the art may combine different embodiments or examples described in the present disclosure and features thereof if there is no contradiction.

Those described above are merely exemplary embodiments of the present disclosure, rather than limitations thereto. For those skilled in the art, the embodiments of the present disclosure may have various amendments or variations. Any modifications, alternations, improvements, etc., made by those skilled in the art without departing from the concepts and principles of the present disclosure shall fall within the scope of the claims of the present disclosure.

The invention claimed is:

1. A method for evaluating volumes of discharged hydrocarbon and externally charged hydrocarbon in a mud shale, comprising:
   obtaining the mud shale from a target block;
   performing a total organic carbon test and a pyrolysis analysis test on the mud shale to obtain the total organic carbon test data and the pyrolysis analysis test data;
   determining, by a processor, a hydrogen index and a current hydrocarbon generation potential parameter of the mud shale in a target block based on total organic carbon test data and pyrolysis analysis test data of the mud shale;
   determining, by the processor, an original hydrogen index of the mud shale based on the hydrogen index and the pyrolysis analysis test data;
   evaluating, by the processor, a volume of discharged hydrocarbon and a volume of externally charged hydrocarbon in the mud shale based on the current hydrocarbon generation potential parameter and the original hydrogen index; and
   determining whether to perform oil production on the target block based on the volume of discharged hydrocarbon and the volume of externally charged hydrocarbon in the mud shale.

2. The method according to claim 1, wherein determining the hydrogen index and the current hydrocarbon generation potential parameter of the mud shale based on the total organic carbon test data and the pyrolysis analysis test data of the mud shale comprises:
   performing, by the processor, a light hydrocarbon correction on the pyrolysis analysis test data; and
   determining, by the processor, the current hydrocarbon generation potential parameter based on the total organic carbon test data and the pyrolysis analysis test data on which the light hydrocarbon correction has been performed.

3. The method according to claim 1, wherein determining the original hydrogen index of the mud shale based on the hydrogen index and the pyrolysis analysis test data comprises:
   classifying, by the processor, organic matter types of the mud shale based on the hydrogen index and the pyrolysis analysis test data; and
   determining, by the processor, the original hydrogen index based on the organic matter types and the hydrogen index.

4. The method according to claim 3, wherein determining the original hydrogen index based on the organic matter types and the hydrogen index comprises:
   establishing, by the processor, evolution models of various types of kerogen of the mud shale based on the organic matter types; and
   determining, by the processor, the original hydrogen index of the mud shale based on the evolution models and the hydrogen index.

5. The method according to claim 4, wherein the evolution models represent variation relationships between the hydrogen indexes of various types of kerogen and the pyrolysis analysis test data.

6. The method according to claim 4, wherein determining the original hydrogen index of the mud shale based on the evolution models and the hydrogen index comprises:
   calculating, by the processor, hydrocarbon generation conversion rates corresponding to various types of kerogen at different thermal evolution maturities based on the evolution models; and
   determining, by the processor, the original hydrogen index based on the hydrocarbon generation conversion rates and the hydrogen index.

7. An electronic device comprising a memory, a processor, and a computer program stored in the memory and executable on the processor, wherein the processor is configured to execute the computer program to implement the following steps of a method for evaluating volumes of discharged hydrocarbon and externally charged hydrocarbon in a mud shale:
   determining a hydrogen index and a current hydrocarbon generation potential parameter of the mud shale in a target block based on total organic carbon test data and pyrolysis analysis test data of the mud shale;
   determining an original hydrogen index of the mud shale based on the hydrogen index and the pyrolysis analysis test data; and
   evaluating a volume of discharged hydrocarbon and a volume of externally charged hydrocarbon in the mud shale based on the current hydrocarbon generation potential parameter and the original hydrogen index.

8. The electronic device according to claim 7, wherein the processor is further configured to execute the computer program to implement the following steps:
- performing a light hydrocarbon correction on the pyrolysis analysis test data; and
- determining the current hydrocarbon generation potential parameter based on the total organic carbon test data and the pyrolysis analysis test data on which the light hydrocarbon correction has been performed.

9. The electronic device according to claim 7, wherein the processor is further configured to execute the computer program to implement the following steps:
- classifying organic matter types of the mud shale based on the hydrogen index and the pyrolysis analysis test data; and
- determining the original hydrogen index based on the organic matter types and the hydrogen index.

10. The electronic device according to claim 9, wherein the processor is further configured to execute the computer program to implement the following steps:
- establishing evolution models of various types of kerogen of the mud shale based on the organic matter types; and
- determining the original hydrogen index of the mud shale based on the evolution models and the hydrogen index.

11. The electronic device according to claim 10, wherein the evolution models represent variation relationships between the hydrogen indexes of various types of kerogen and the pyrolysis analysis test data.

12. The electronic device according to claim 10, wherein the processor is further configured to execute the computer program to implement the following steps:
- calculating hydrocarbon generation conversion rates corresponding to various types of kerogen at different thermal evolution maturities based on the evolution models; and
- determining the original hydrogen index based on the hydrocarbon generation conversion rates and the hydrogen index.

* * * * *